(No Model.)    10 Sheets—Sheet 1.

H. H. CUMMINGS & P. A. COUPAL.
PEGGING MACHINE.

No. 493,910.    Patented Mar. 21, 1893.

WITNESSES:
A. D. Harrison.
K. E. Brown.

INVENTORS:
H. H. Cummings
P. A. Coupal
by Wright Brown Crosley
Attys.

(No Model.) 10 Sheets—Sheet 3.

H. H. CUMMINGS & P. A. COUPAL.
PEGGING MACHINE.

No. 493,910. Patented Mar. 21, 1893.

WITNESSES:

INVENTORS:

(No Model.) 10 Sheets—Sheet 4.

H. H. CUMMINGS & P. A. COUPAL.
PEGGING MACHINE.

No. 493,910. Patented Mar. 21, 1893.

WITNESSES:
A. D. Harrison
K. E. Brown

INVENTORS:
H. H. Cummings
P. A. Coupal
by Wright Brown Crossley
Attys.

(No Model.) 10 Sheets—Sheet 5.

H. H. CUMMINGS & P. A. COUPAL.
PEGGING MACHINE.

No. 493,910. Patented Mar. 21, 1893.

WITNESSES:
A. D. Harrison.
K. E. Brown.

INVENTORS:
H. H. Cummings
P. A. Coupal
by Wright Brown Crosley
Attys.

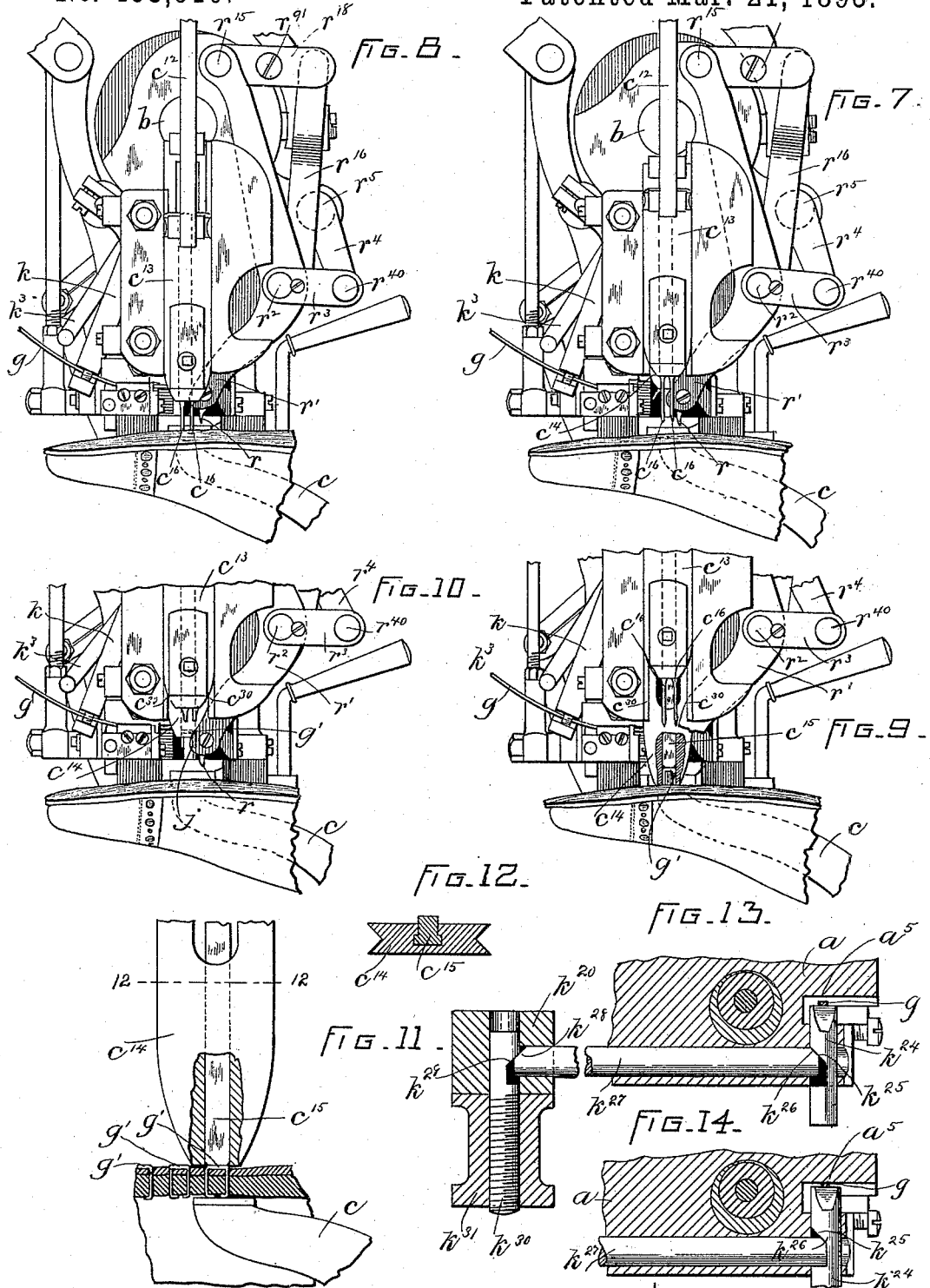

(No Model.) 10 Sheets—Sheet 7.
H. H. CUMMINGS & P. A. COUPAL.
PEGGING MACHINE.
No. 493,910. Patented Mar. 21, 1893.
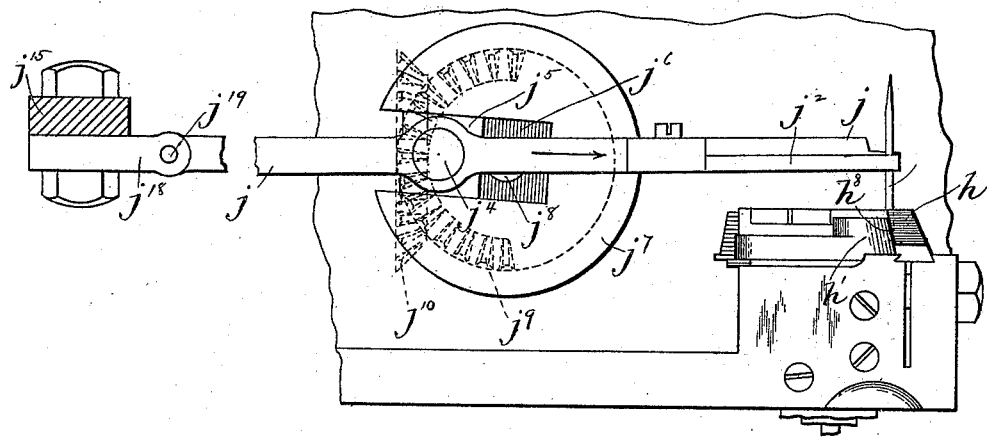
Fig. 15.
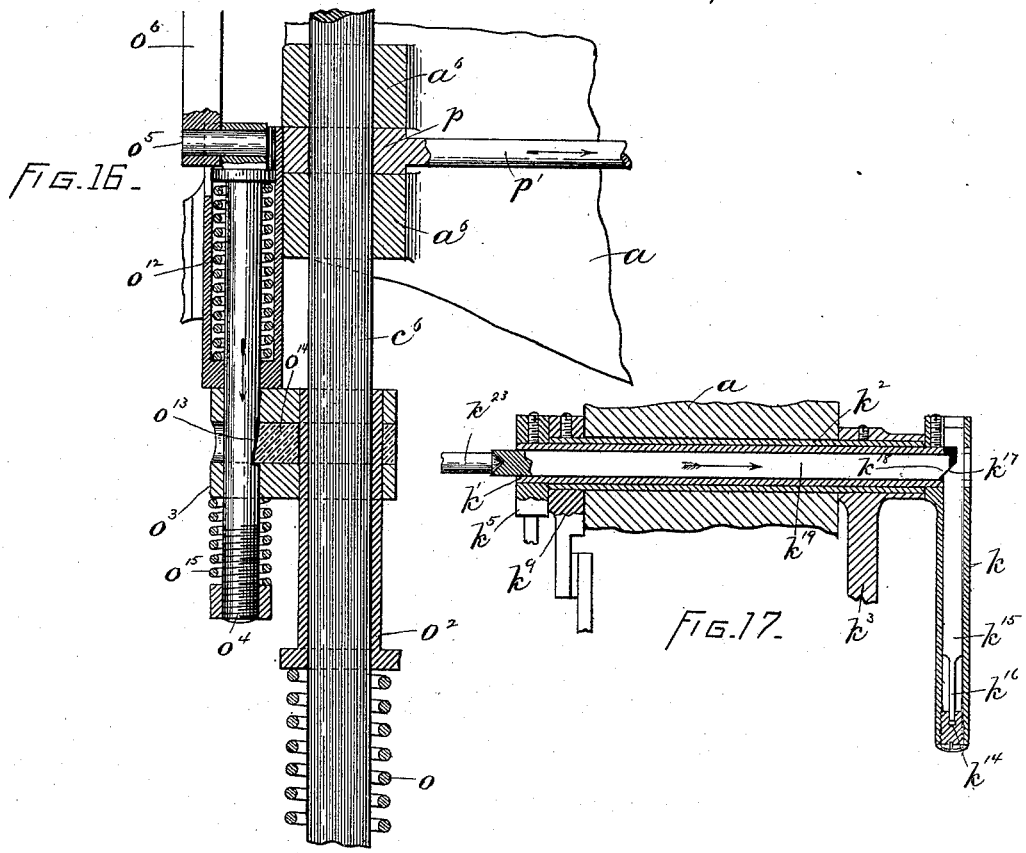
Fig. 16.
Fig. 17.
WITNESSES:
A. D. Harrison.
K. E. Brown.
INVENTORS:
H. H. Cummings
P. A. Coupal
by Wright Brown Quimby
Attys.
THE NORRIS PETERS CO., PHOTO-LITHO., WASHINGTON, D. C.

(No Model.) 10 Sheets—Sheet 8.
H. H. CUMMINGS & P. A. COUPAL.
PEGGING MACHINE.
No. 493,910. Patented Mar. 21, 1893.
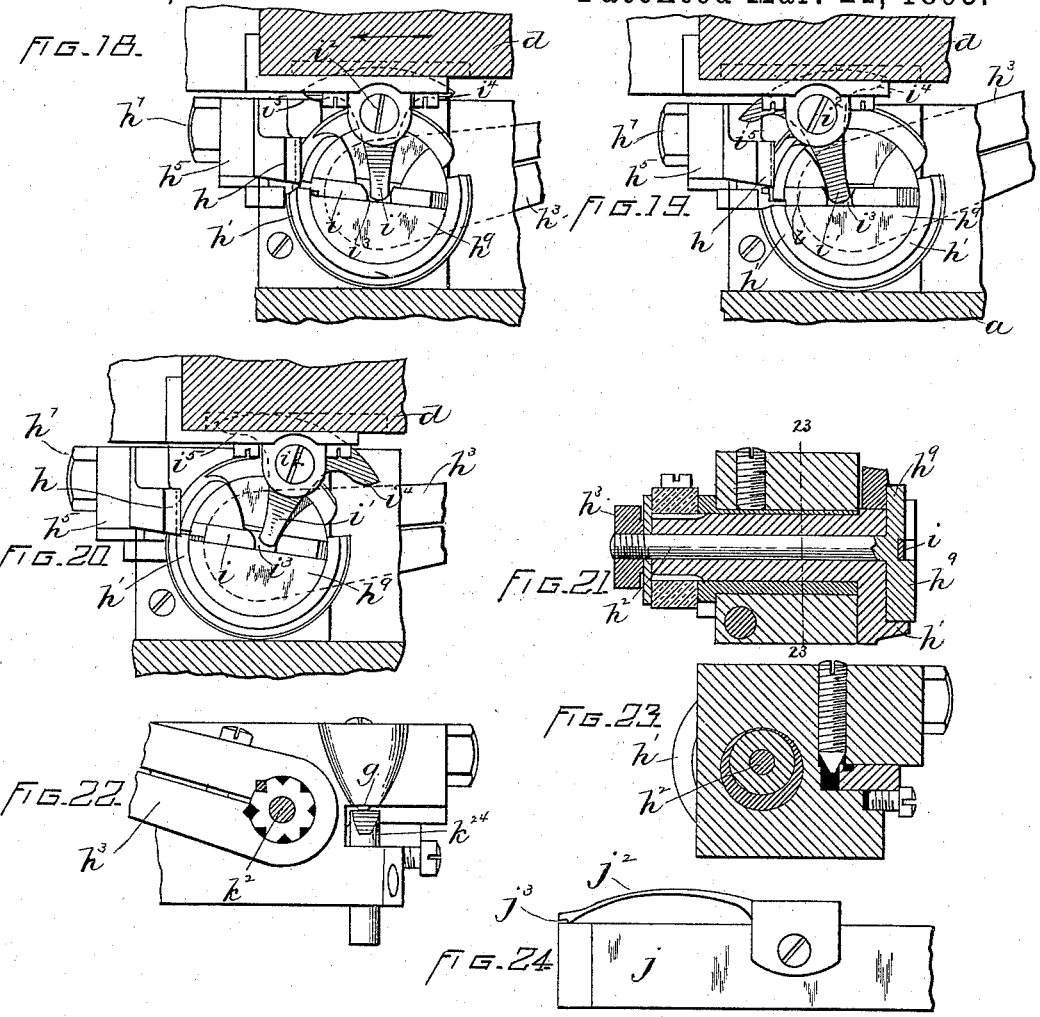
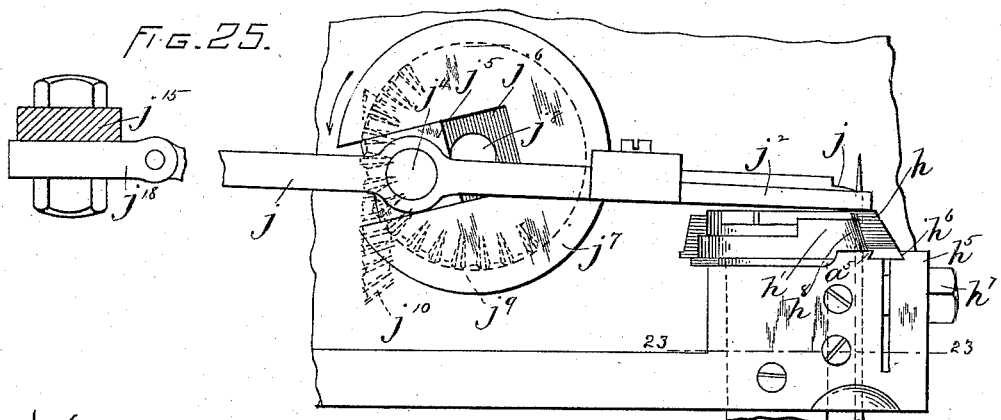
WITNESSES:
A. D. Harrison.
L. E. Brown.
INVENTORS
H. H. Cummings
P. A. Coupal
by Wright Brown Crosley
Attys.

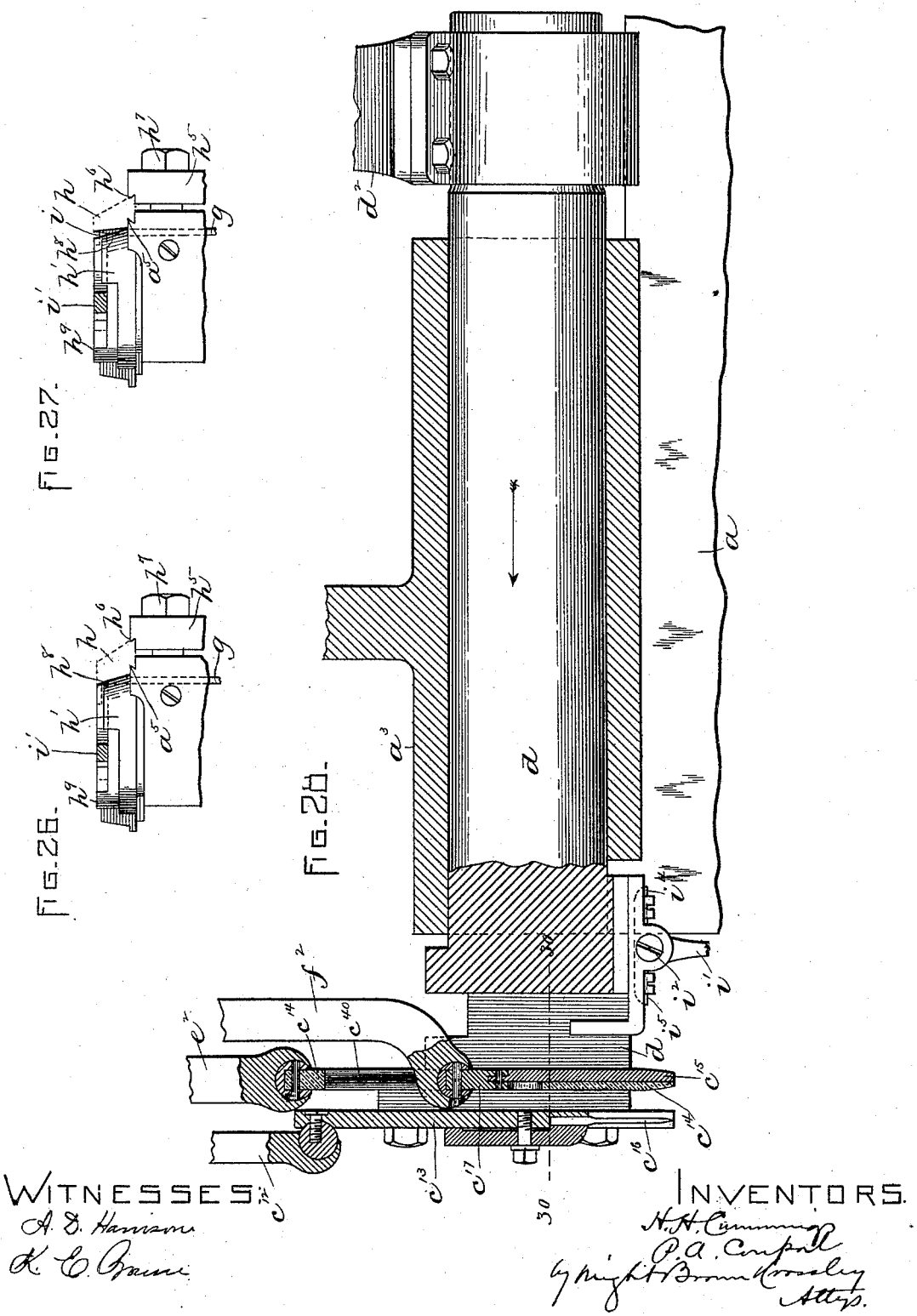

(No Model.) 10 Sheets—Sheet 10.

H. H. CUMMINGS & P. A. COUPAL.
PEGGING MACHINE.

No. 493,910. Patented Mar. 21, 1893.

WITNESSES:

INVENTORS.

UNITED STATES PATENT OFFICE.

HENRY H. CUMMINGS, OF MALDEN, AND PETER A. COUPAL, OF BOSTON, ASSIGNORS TO STEPHEN MOORE, TRUSTEE, OF NEWTON, MASSACHUSETTS.

PEGGING-MACHINE.

SPECIFICATION forming part of Letters Patent No. 493,910, dated March 21, 1893.

Application filed July 11, 1892. Serial No. 439,568. (No model.)

*To all whom it may concern:*

Be it known that we, HENRY H. CUMMINGS, of Malden, in the county of Middlesex, and PETER A. COUPAL, of Boston, in the county of Suffolk, State of Massachusetts, have invented certain new and useful Improvements in Boot or Shoe Nailing Machines, of which the following is a specification.

This invention relates to machines for securing boot or shoe soles and other articles by means of staples, which are made and driven by one and the same machine.

The invention has for its object, mainly, to provide a machine of this class with means for perforating the stock for the reception of the staples, for regulating the length of the staples and the depth of the holes made to receive them, automatically, by the thickness of the sole or part into which the staples are driven, and to generally improve the construction and mode of operation of such machines.

To these ends, the invention consists in the improvements which we will now proceed to describe and claim.

Figure 1:
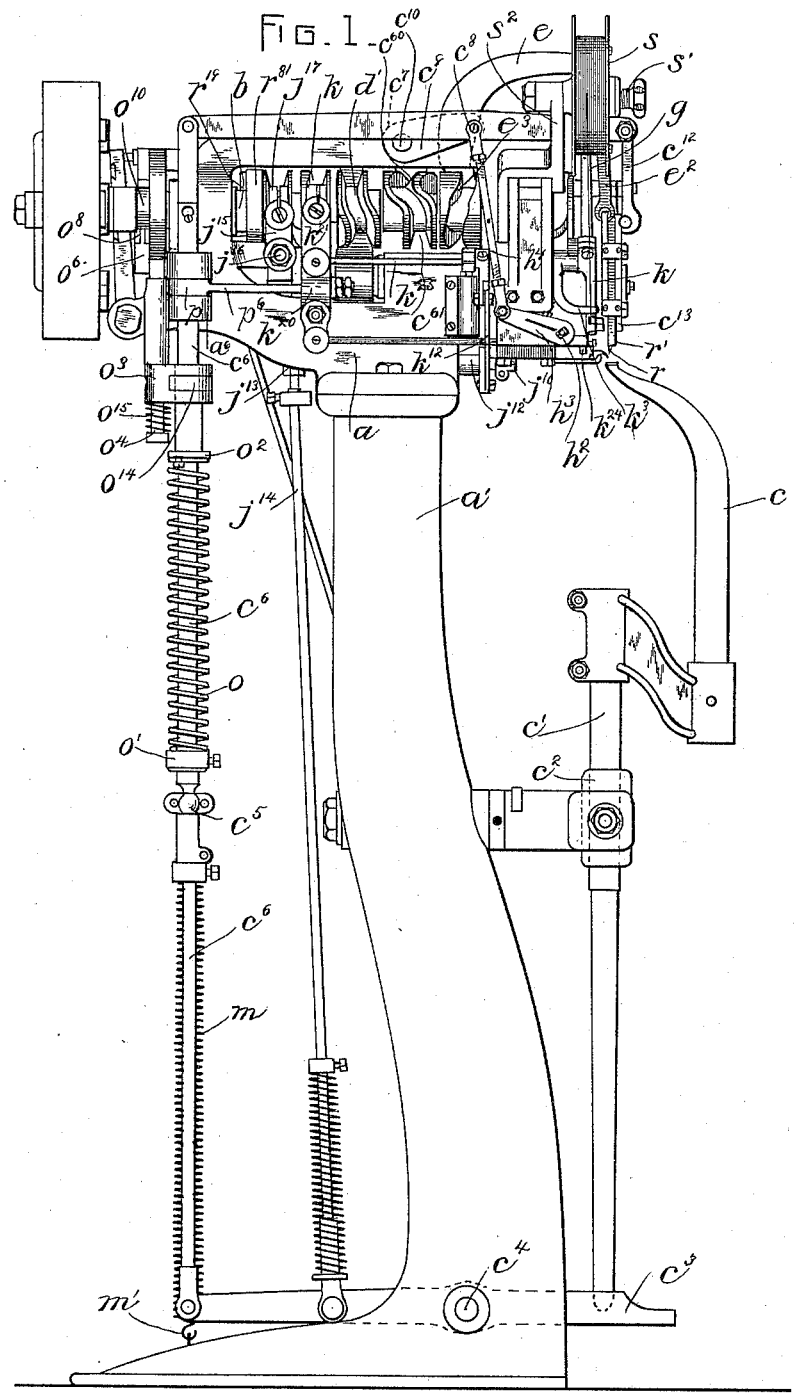
Figure 2:
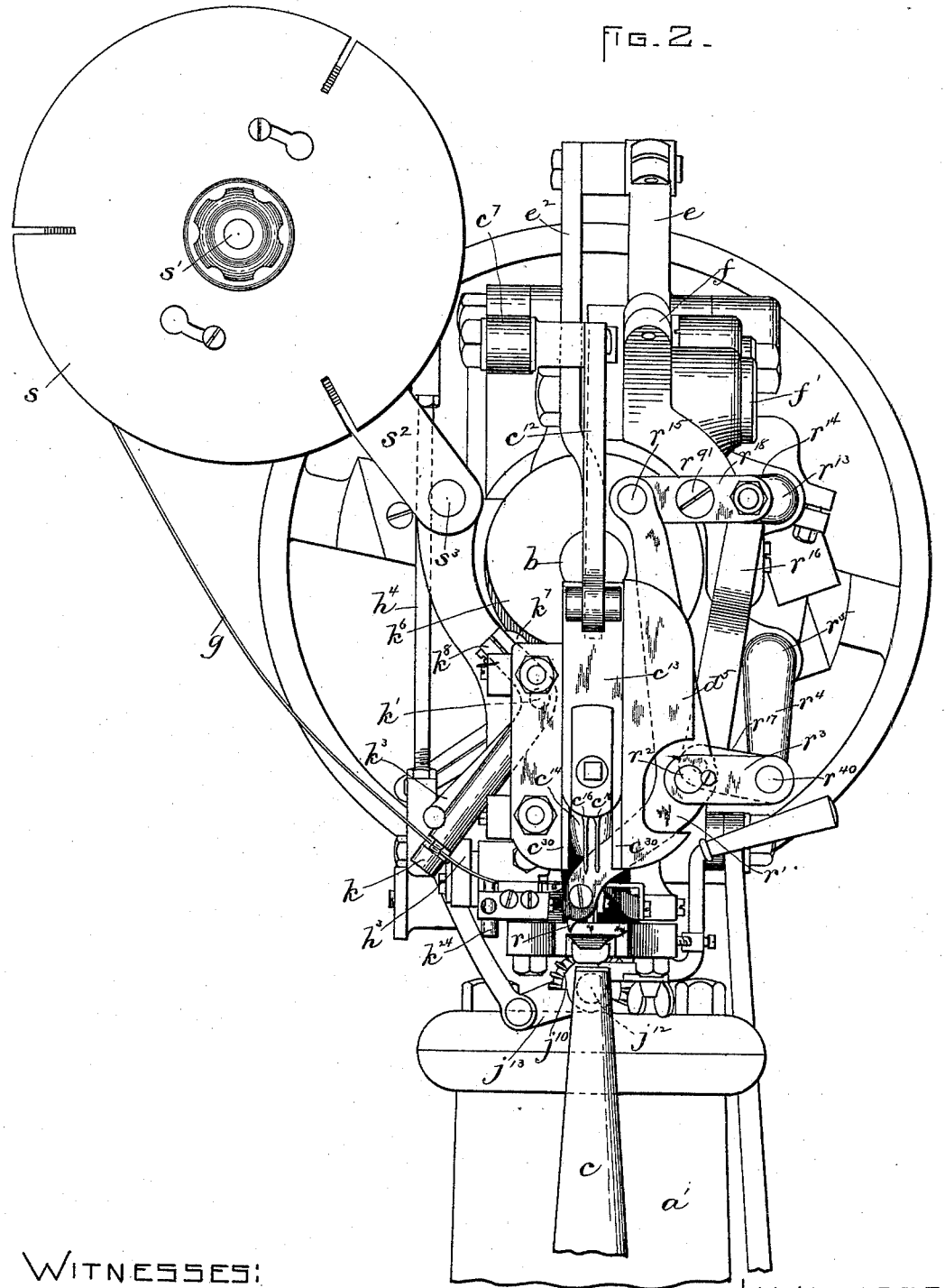
Figure 3:
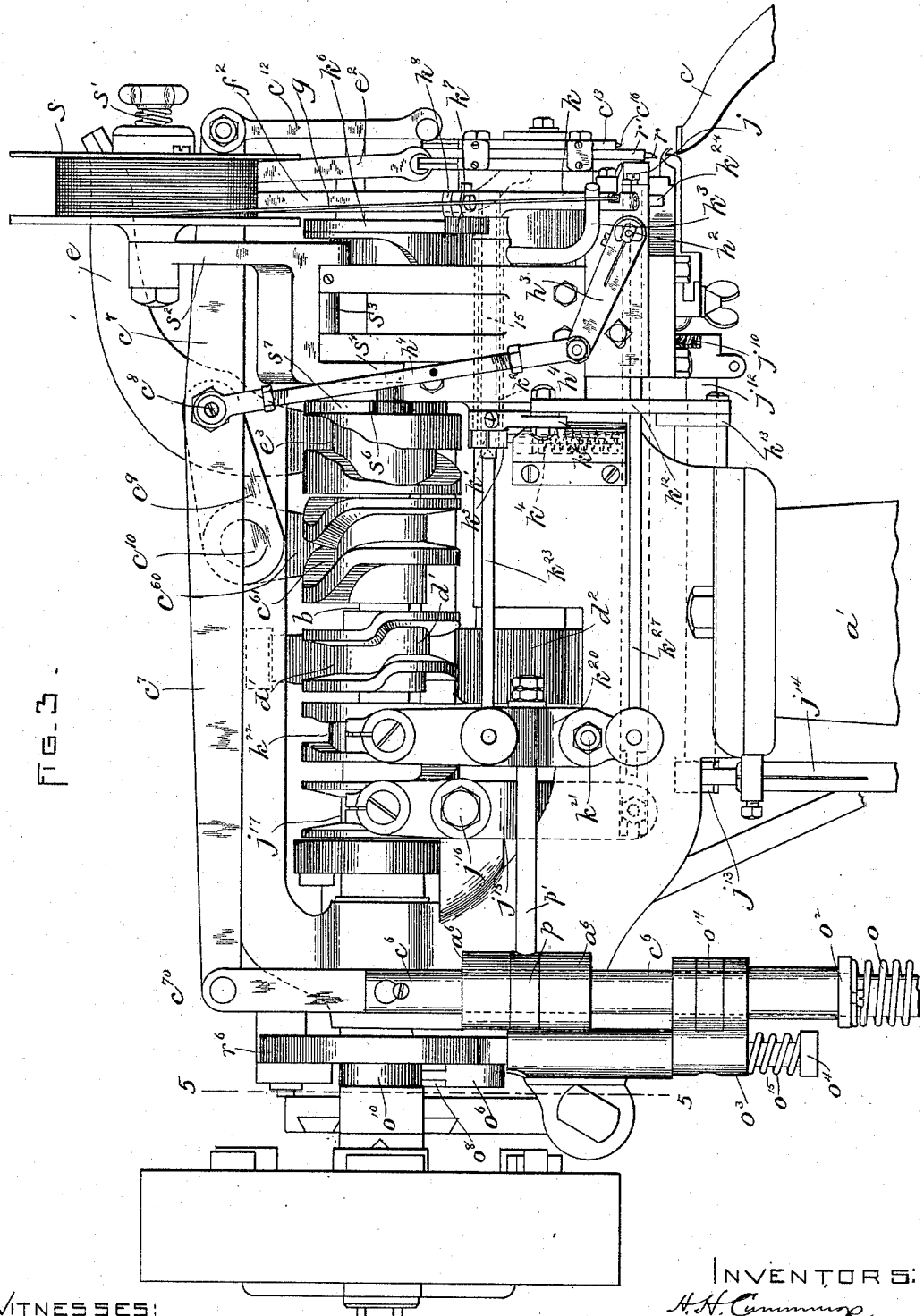
Figure 4:
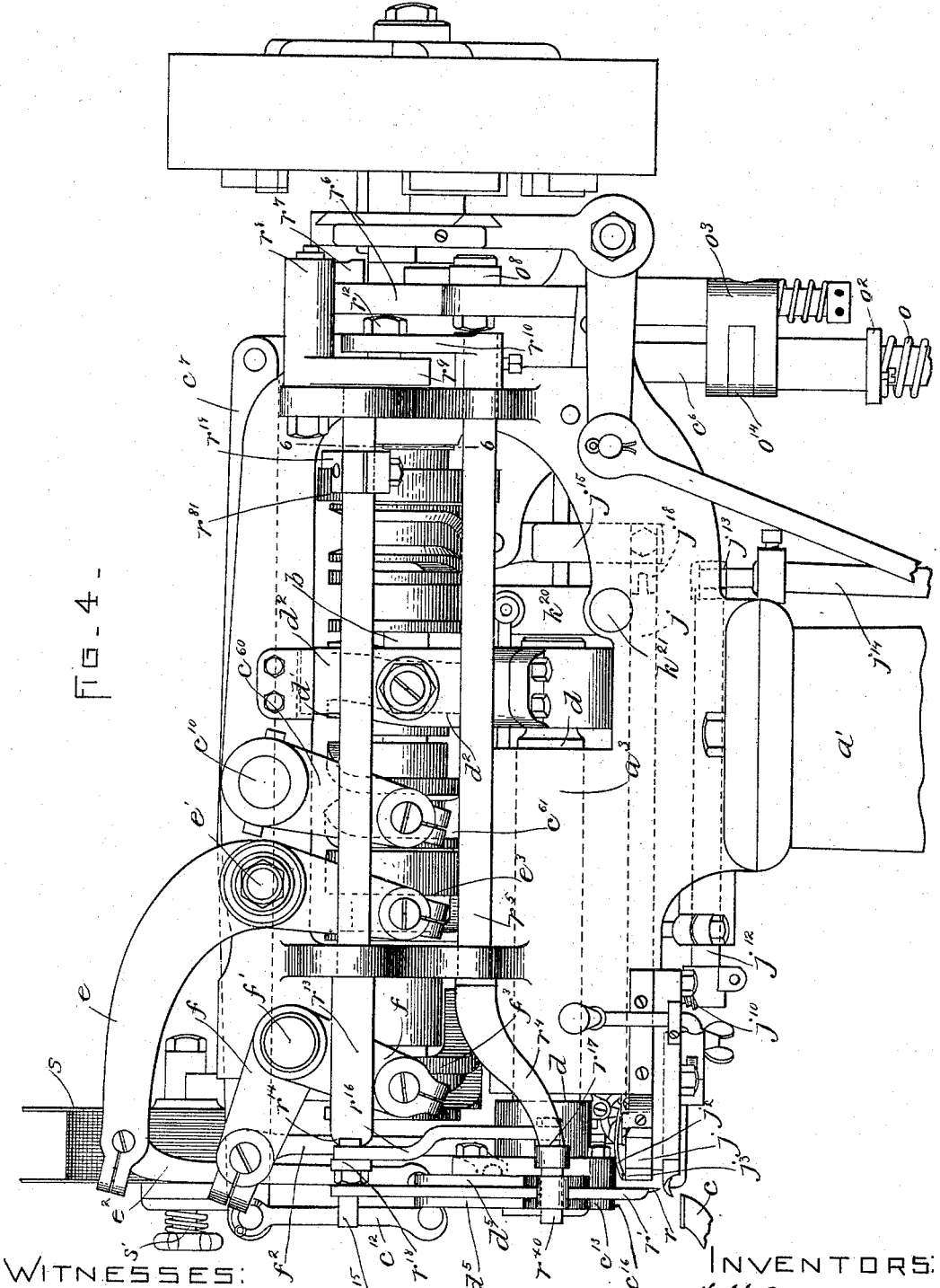
Figure 5:
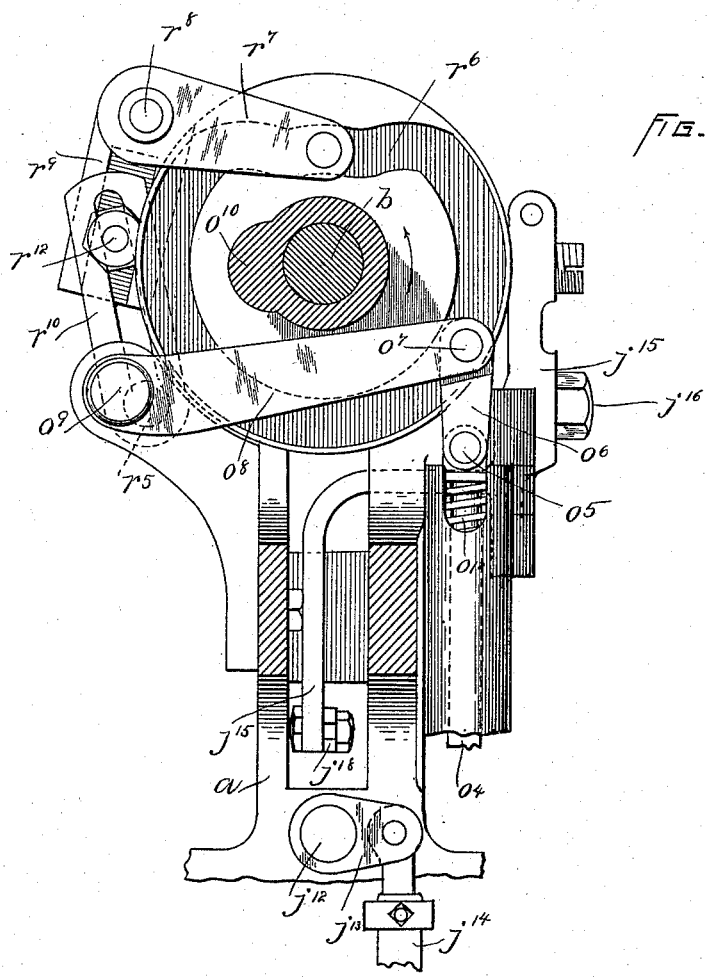
Figure 6:
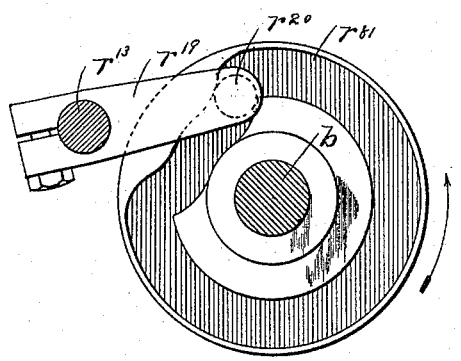
Figure 29:
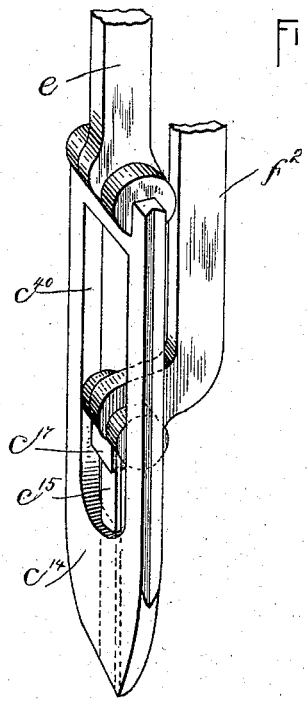
Figure 30:
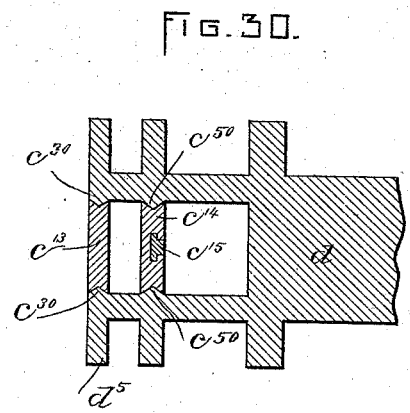

Of the accompanying drawings, forming part of this specification: Figure 1 represents a side elevation of a staple making and driving machine embodying our invention, adapted for boot or shoe work. Fig. 2 represents a front elevation of the upper portion of the machine, on a larger scale. Fig. 3 represents a side elevation of the portion shown in Fig. 2. Fig. 4 represents an elevation of the opposite side from that shown in Fig. 3. Fig. 5 represents a section on line 5—5, Fig. 3, looking toward the right. Fig. 6 represents a section on line 6—6, Fig. 4, looking toward the left. Figs. 7, 8, 9 and 10 represent end elevations of a portion of the machine, showing different stages of the operation. Fig. 11 represents a view of a portion of the staple driver, the staple throat and the horn, and a sectional view of a portion of a boot or shoe interposed between the throat and horn. Fig. 12 represents a section on line 12—12, Fig. 11. Figs. 13 and 14 represent sectional views of one of the wire-clamping and releasing devices. Fig. 15 represents a top view of the wire-cutters, the staple-forming anvil, and the means for adjusting the position of the anvil. Fig. 16 represents a sectional view, showing the means for automatically increasing the spring pressure on the horn and for locking the horn. Fig. 17 represents a sectional view, showing the means for locking the wire to the wire-feeding arm. Figs. 18, 19 and 20 represent side views of the cutters, showing them in different positions. Fig. 21 represents a sectional view of the cutters and their supporting and adjusting devices. Fig. 22 represents a side view of a part of the machine. Fig. 23 represents a section on line 23—23, Fig. 21. Fig. 24 represents a side view of a portion of the staple-forming anvil. Fig. 25 represents a view similar to Fig. 15, showing the anvil in a different position. Figs. 26 and 27 represent edge views of the cutters, showing the operation of bending the point of the wire. Fig. 28 represents a partial side view and partial section of the sliding head, and sectional views of the awl-bar, staple-throat and driver-bar carried by said head. Fig. 29 represents a perspective view of the staple-receiving throat and the driver located therein, together with parts of the devices which operate said throat and driver. Fig. 30 represents a section on line 30—30, Fig. 28.

The same letters of reference indicate the same parts in all the figures.

In the drawings: $a$ represents the supporting-frame, which is mounted upon a standard $a'$, and is provided with bearings, in which the driving-shaft $b$ is journaled. The driving-shaft $b$ is provided with a series of cams, which give motion to the operative parts of the machine, as hereinafter described, the said shaft being driven by power applied through a suitable clutch, and provided with a stop-motion whereby, after a complete rotation of the shaft, causing the feeding forward of a length of wire, the cutting off of the wire to form the blank, the bending of said blank into a staple and the insertion of said staple into the material, the movement of the shaft is automatically stopped.

$c$ represents the work-supporting horn, which is affixed to a horn-spindle $c'$, adapted to move vertically in a guide $c^2$, affixed to the standard $a'$, the lower end of said spindle resting upon a lever $c^3$, which is pivoted at $c^4$ to the standard $a'$. The rear end of said lever is connected by a rod $c^6$, which is preferably made in two sections jointed at $c^5$, with a lever $c^7$, which is pivoted at $c^8$ to an arm $c^9$, affixed to a rock-shaft $c^{10}$, the latter being mounted to turn in a bearing on the supporting-frame, and provided with an arm $c^{60}$, engaging a cam $c^{61}$ on the driving-shaft. The forward end of the lever $c^7$ is connected by a link $c^{12}$ with an awl-bar or slide $c^{13}$, which is fitted to move vertically in guides $c^{30}$ (Figs. 2 and 30), on a sliding head $d$, which is mounted upon the frame $a$ so as to move lengthwise of the driving-shaft.

$c^{14}$ represents the throat, through which the staples are driven into the stock by means of a driver $c^{15}$, attached to a reciprocating driver-bar $c^{17}$ (Figs. 28 and 29), the driver-bar being movable vertically in a slot $c^{40}$ (Fig. 29) in the throat $c^{14}$, while the driver is fitted to reciprocate in a guide formed in said throat.

The throat $c^{14}$ is fitted to slide vertically on guides $c^{50}$ (Fig. 30) on the head $d$. The head $d$ slides in a fixed guide $a^3$ (Figs. 4 and 28), and is reciprocated by means of a cam $d'$ (Figs. 3 and 4), affixed to the driving-shaft, and engaging a trundle-roll on an arm $d^2$, affixed to said head, the reciprocating movement of the head being such that the awls $c^{16}$ carried by the awl-bar $c^{13}$, and the staple-receiving throat $c^{14}$, occupy alternately the same position over the stock, so that the awls first penetrate the stock and make holes to receive the legs of the staple when the staple-throat is brought into position over said holes, two awls being employed, as shown in Figs. 2, 7, 8 and 9. The awl-bar, as already stated, is reciprocated by means of a lever $c^7$ and link $c^{12}$.

The throat $c^{14}$ is given a vertical reciprocating movement by means of a lever $e$ (Fig. 4), which is pivoted at $e'$ to the supporting-frame, and is connected at one end with the said throat by means of a link $e^2$, the other end of said lever having a trundle-roll, which is engaged with a cam $e^3$ affixed to the driving-shaft. The reciprocating motion of the throat is much shorter than that of the awls and driver, and is sufficient to cause the lower end of the throat to co-operate with the anvil hereinafter described in bending the staple blank into staple form and to stand in position to support the upper surface of the sole against the pressure of the horn.

The driver-bar $c^{17}$ is reciprocated by means of a lever $f$ (Fig. 4), pivoted at $f'$ to the supporting-frame, and connected at one end by a link $f^2$ with the driver-bar, and at its other end by a trundle-roll with a cam $f^3$ affixed to the driving-shaft.

The links $c^{12}$, $e^2$ and $f^2$, that communicate motion respectively to the awl-bar, the throat and the driver-bar, are pivotally connected to said awl-bar, throat and driver-bar, as well as to the levers which give them motion, said connection permitting the described movement of the sliding head $d$, without interfering with the operativeness of the awl-bar, throat and driver.

The wire $g$, from which the staples are made, is severed into lengths by means of a fixed cutter $h$ and an oscillating cutter $h'$. The oscillating cutter is affixed to a hub or holder $h^9$, formed on or attached to a shaft or stud $h^2$ (Figs. 3 and 21), which is journaled in a suitable bearing on the supporting-frame, and is oscillated by means of an arm $h^3$ affixed to said shaft, and a link $h^4$ (Fig. 3) connecting said arm with the lever $c^7$ above described. The oscillating cutter $h'$ is of segmental form, as best shown in Figs. 18, 19 and 20. The fixed cutter $h$ is secured to the supporting-frame by means of a clamp $h^5$, having a dove-tail rib $h^6$ (Fig. 25), engaged with a beveled surface on the cutter $h$, said clamp being supported by the frame $a$, and adjusted by a bolt $h^7$. The supporting-frame has a dove-tail rib $a^5$, engaging a corresponding rib on the cutter $h$, the construction being such that, by loosening the bolt $h^7$, the cutter $h$ will be released, while by tightening said bolt the cutter will be firmly held. The cutting edges of the cutters $h$ and $h'$ are diagonally arranged with relation to the wire $g$, which is fed between said cutters, the line of said cutting edges being indicated at $h^8$ (Figs. 25, 26, and 27), so that the wire is severed diagonally, the ends formed by the severing operation being there sharply pointed.

The oscillating cutter $h'$ carries a bending device, which bends the pointed end formed on the main body of the wire sufficiently to bring the point into line with the longitudinal center of the wire, substantially as shown in Letters Patent of the United States No. 438,100, granted to Peter A. Conpal October 7, 1890. Said bending device is here shown as a slide or bar, $i$, which is fitted to move lengthwise in a slot or guide in the hub or holder $h^9$ to which the oscillating cutter is affixed. Said bender or bar is reciprocated in its guiding slot by means of a lever $i'$, which is pivoted at $i^2$ to the sliding head $d$, and is engaged with a slot $i^3$ in the bar $i$. The lever $i'$ is provided with two arms $i^4$ $i^5$, which are arranged so that, when the sliding head is moving forward in the direction indicated by the arrow in Fig. 18, the arm $i^4$ will be caused to strike a surface on the head $d$ before the head has reached the limit of its forward motion, as indicated in Fig. 19, the lever $i'$ being thus engaged with the sliding head, so that it moves bodily forward and imparts a forward movement to the bender $i$, thus causing the latter to bend the point of the wire $g$, this movement taking place just after the wire has been severed. When the sliding head is moved in the opposite direction, the arm $i^5$ strikes a surface on the slide before the completion of the said movement, as shown in Fig. 20, so that the arm $i'$ is again locked to the sliding head, and gives the bender $i$ a backward movement. It will be observed that, when both of the arms $i^4$ $i^5$ are out of contact with the sliding head, the arm $i'$ is free to turn on its pivot $i^2$, so that, during the first part of each movement of the sliding head, the arm $i'$ will be arrested and prevented from moving bodily forward by the bender $i$. Hence there is no movement of the bender until the arm $i'$ has been locked or made rigid with the sliding head, by contact of one of its arms $i^4$ $i^5$ with said head, as above described.

$j$ (Figs. 10, 15, 24 and 25) represents the anvil, over which each length of wire severed by the cutters is bent to form a staple. Said anvil is provided with a blank-holding spring or spring finger $j^2$ (Figs. 4 and 24), having a recess $j^3$ at its free end, into which the wire is forced by the wire-feeding mechanism hereinafter described, the wire being inserted in said recess and held by the spring $j^2$ in engagement with the anvil before the cutting-off operation. The anvil is pivoted at $j^4$ (Figs. 15 and 25), to a block or slide $j^5$, which is fitted to move freely in a slot $j^6$, formed in a disk $j^7$, which is adapted to rotate on a fixed center or stud $j^8$. The rotary disk $j^7$ and slide $j^5$ constitute a means for varying the position of the fulcrum or pivot $j^4$ of the anvil laterally and thus moving the anvil toward or from the cutters, for the purpose of decreasing or increasing the length of wire projected across the anvil and thus varying the length of one leg of the staple, a rotary movement of the disk $j^7$ in the direction indicated by the arrow in Fig. 25 causing the anvil to move toward the cutters $h$ $h'$, while a rotary movement of said disk in the opposite direction causes the anvil to move away from said cutters, as shown in Fig. 15.

We have provided automatic means for connecting the disk $j^7$ with the work-supporting anvil, so that the position of said disk, and therefore the distance of the anvil from the cutters, will be determined by the position of the anvil, said means being preferably as follows: The under side of the disk $j^7$ is provided with a bevel gear segment $j^9$, shown in dotted lines in Figs. 15 and 25. With said segment meshes another bevel gear segment $j^{10}$, affixed to a shaft $j^{12}$, which is journaled in a bearing in the supporting-frame, and is provided with an arm $j^{13}$ (Figs. 1, 2 and 3), which is connected by a rod $j^{14}$ with the lever $c^3$ supporting the horn spindle $c'$. It will be seen that the vertical movements of the horn are imparted, through the spindle $c'$, lever $c^3$, connecting-rod $j^{14}$ and the described intermediate devices, to the disk $j^7$, a downward movement of the horn causing a movement of the anvil away from the cutters, while an upward movement of the horn causes a movement of the anvil toward the cutters.

The anvil $j$ is given a longitudinal reciprocating movement, by means of a lever $j^{15}$ (Figs. 3, 15 and 25), pivoted at $j^{16}$ to the supporting-frame, and having at one end a trundle-roll, engaged with a cam $j^{17}$ on the driving-shaft, the lower end of said lever being provided with an ear $j^{18}$, which is pivotally connected at $j^{19}$ with the rear end of the anvil $j$. The rotation of the cam $j^{17}$ causes the lever $j^{15}$ to oscillate, and thus reciprocate the anvil. The movements of the lever $j^{15}$ are so timed that the anvil is at the rear extreme of its reciprocating movement, as shown in Figs. 15 and 25, when the wire is being fed across the anvil and cut off to form a staple blank, the anvil being moved forward or in the direction indicated by the arrow in Fig. 15 after the staple blank has been engaged with the anvil and cut off, this movement causing the anvil to carry the blank to a point under the throat $c^{14}$, so that, upon the descent of the throat, the latter will bend the blank into the form of a staple $g'$ across the anvil, as shown in Fig. 10. The lateral adjustment of the anvil, caused by the rotation of the disk $j^{17}$, takes place when the anvil is at the end of its backward movement and the slide $j^5$ is at its maximum distance from the shaft or center $j^8$ on which the disk $j^7$ turns; consequently, when the anvil is moved forward from the position shown in Figs. 15 and 25 to carry the blank into position for bending, the slide $j^5$ moves into alignment with the shaft or center $j^8$ when the anvil reaches the forward extreme of its movement, so that the position of the anvil when it presents the blank to the bending throat is always the same, regardless of the adjustment of the disk $j^7$, the anvil being given a lateral movement while it is moving forward, when the slot $j^6$ is diagonal relatively to the direction of longitudinal movement of the anvil.

We have provided devices for feeding the wire across the anvil a distance corresponding to the vertical position of the horn, so that the length of the wire feed, as well as the lateral position of the anvil, is determined by the distance between the work-supporting end of the horn and the lower end of the throat through which the staples are driven. Said wire-feeding mechanism will next be described.

$k$ represents a wire-feeding arm, which is affixed to a tubular rod or shaft $k'$ (see Fig. 17), journaled in an outer tubular shaft $k^2$ (Fig. 17), the latter being journaled in a fixed bearing in the supporting-frame, and being connected, as hereinafter described, with the horn, and provided with a feed-regulating arm $k^3$, which is bent or curved, as shown in Fig. 3, so that its outer end extends across the path in which the feed arm $k$ is adapted to swing. The feed arm $k$ is normally pressed outwardly against the regulating arm $k^3$, by means of a spring $k^4$, shown in dotted lines in Fig. 3, said spring being arranged so that it presses upwardly on the outer end of an arm $k^5$, affixed to the tubular shaft $k'$, the pressure of said spring tending to rotate the shaft $k'$ in the direction required to press the feed arm $k$ against the regulating arm $k^3$, so that said regulating arm constitutes a stop which limits the movement of the feed arm away from the cutters, and is automatically adjusted by the hereinafter described connections between the shaft $k^2$ to which the said regulating arm is attached and the horn of the machine. The feed arm $k$ is moved inwardly toward the cutters at intervals, by means of a cam $k^6$ (Figs. 2 and 3), affixed to the driving-shaft, and a trundle-roll $k^7$ mounted on an extension $k^8$ of the feed arm $k$, said extension and the trundle-roll being so arranged that the pressure of the spring $k^4$, which holds the feed arm against the regulating arm, also holds the trundle-roll $k^7$ against the cam $k^6$.

The above-mentioned connections between the feed-regulating arm $k^3$ and the horn of the machine comprise the tubular shaft $k^2$ to which said arm is affixed, an arm $k^9$ (Figs. 3 and 17) affixed to said shaft, and a link $k^{12}$ connecting the arm $k^9$ with an arm $k^{13}$ affixed to the rock-shaft $j^{12}$, said rock-shaft being connected with the horn, as already described, by means of the arm $j^{13}$, rod $j^{14}$, lever $c^3$ and horn spindle $c'$. Vertical movements or changes of position of the horn are therefore imparted, through the spindle $c'$, lever $c^3$, rod $j^{14}$, rock-shaft $j^{12}$, arm $k^{13}$, connecting-rod $k^{12}$ and tubular shaft $k^2$, to the regulating arm $k^3$, the downward movement of the horn causing an outward movement of said regulating arm, and permitting an increased movement of the feed arm away from the cutters, while an upward movement of the horn causes a movement of the feed-regulating arm toward the cutters.

The feed arm $k$ is provided with a wire-receiving slot $k^{14}$ (Fig. 17), near its outer end, said slot passing transversely through the arm, its bottom constituting a bearing surface against which the wire is intermittingly clamped by means of a clamping plunger $k^{15}$, which is longitudinally movable in the arm $k$, and is provided with a reduced lower end or jaw $k^{16}$, adapted to enter and slide in the slot $k^{14}$. The plunger $k^{15}$ is provided near its upper end with a incline $k^{17}$ against which bears a corresponding incline $k^{18}$ on a rod or plunger $k^{19}$ which is longitudinally movable in the tubular shaft $k'$. When the plunger $k^{19}$ is moved in the direction indicated by the arrow in Fig. 17, its incline $k^{18}$, acting on the incline of the plunger $k^{15}$, forces said plunger downwardly and causes it to co-operate with the bottom of the slot $k^{14}$ in grasping the wire, this motion taking place when the feed arm $k$ is moving toward the cutters and thus causing the feed arm to positively grasp and move the wire. The described movement is effected by means of a lever $k^{20}$ (Fig. 3), pivoted at $k^{21}$ to the frame of the machine, and provided with a trundle-roll engaged with a cam $k^{22}$ affixed to the driving-shaft, and a rod $k^{23}$, pivoted to the lever $k^{20}$ and bearing at one end against the plunger $k^{19}$. The rotation of the cam $k^{22}$ oscillates the lever $k^{20}$, thus reciprocating the rod $k^{23}$ and causing said rod to alternately press the plunger $k^{19}$ in the direction indicated by the arrow in Fig. 17 and release said plunger, so that the wire is alternately grasped and released, the wire being released when the feed arm is moving away from the cutters.

The backward motion of the wire with the feeding arm, when the latter is moving backwardly, is prevented by means of a clamping jaw $k^{24}$ (Figs. 1, 2, 13 and 14), which is a short rod or plunger, fitted to slide in a guide formed for its reception in the supporting-frame $a$, and arranged to co-operate with a flat surface $a^5$ on the supporting-frame in clamping the wire $g$. The jaw $k^{24}$ is provided with an incline $k^{25}$, on which bears a corresponding incline $k^{26}$, on a rod or plunger $k^{27}$, which is connected with the above-described lever $k^{20}$ which operates the jaw $k^{16}$ in the feeding arm $k$, the last-mentioned jaw being operated from the lever $k^{20}$ through the rod or plunger $k^{23}$, as already described. The plungers $k^{23}$ and $k^{27}$ are located at opposite sides of the pivot or fulcrum $k^{21}$ of lever $k^{20}$, so that the jaws $k^{16}$ and $k^{24}$ are operated alternately, the jaw $k^{24}$ being moved from the position shown in Fig. 13 to that shown in Fig. 14 by the co-operation of the inclines $k^{25}$ and $k^{26}$ just before the feeding arm $k$ moves backwardly, so that the wire is rigidly confined on the frame of the machine during the backward movement of the feeding arm. The plunger $k^{27}$ is moved back to the position shown in Fig. 13, thus releasing the jaw $k^{24}$ and permitting the latter to release the wire just before the feeding arm begins to move toward the cutters. The rod or plunger $k^{27}$ may be connected to the lever $k^{20}$ in any suitable way. We prefer, however, to connect it by the means shown in Fig. 13, one end of the plunger $k^{27}$ being inserted in an orifice in the lever $k^{20}$, and provided with an incline $k^{28}$, which bears on the incline $k^{29}$ forming one side of a recess cut in a screw-threaded rod $k^{30}$, which is movable in an orifice extending across the lever $k^{20}$. A nut $k^{31}$, engaged with said threaded rod, enables the latter to be adjusted endwise and thus impart a slight longitudinal adjustment to the plunger $k^{27}$.

The horn $c$ is at all times pressed upwardly against the stop which rests upon it, by means of a light spring $m$, attached at its lower end at $m'$ to the base of the standard $a'$, and at its upper end to a portion of the jointed connecting-rod $c^6$, said spring constantly exerting a downward pull on the connecting-rod, and consequently an upward pressure, through the lever $c^3$ and spindle $c'$, on the horn, so that the horn is never allowed to descend by gravitation, but always exerts an upward pressure on the stock; hence the position of the horn is always governed by the thickness of the sole or material interposed between it and the throat or support against which the stock is held by the upward pressure of the horn. This constant upward yielding pressure of the horn against the work is an important feature of our invention, since it enables the horn to constitute a reliable device for adjusting the descent of the awls and for determining the length of the staples, as already described. The pressure imparted by the spring $m$ is necessarily light, however, to permit the feeding of the work by the work-feeding devices hereinafter described, its pressure being only sufficient to keep the horn in continuous contact with the work, and the work in continuous contact with the throat or device against which it is pressed by the horn. It is desirable, however, to give the horn a stronger pressure against the material, and the material a stronger pressure against the throat, prior to the operation of penetrating the stock by the awls and driving and clinching the staples in order that the stock may be firmly compressed between the horn and the throat through which the staples are driven, before the horn is locked to support the thrust or pressure of the awls and the driver, suitable locking devices being provided whereby the horn is intermittingly locked or made rigid, as presently described. We have therefore provided an auxiliary spring $o$, one end of which bears on a collar or enlargement $o'$ on the connecting-rod $c^6$, while its other end bears upon a tension-adjusting device, which is automatically moved by the power of the machine so as to throw the pressure of the spring $o$ upon the horn, through the intermediate connections, after the material has been fed. The said tension-adjusting device is a collar or sleeve $o^2$, which is movable vertically upon the connecting-rod $c^6$, and is adapted to be depressed thereon to compress the spring $o$, and raised to loosen said spring. The sleeve $o^2$ is attached at its upper end to an arm $o^3$ (Figs. 3 and 16), through which passes a vertical rod $o^4$, the upper end of which is connected by a pivot $o^5$ with a link $o^6$, pivoted at $o^7$ (Fig. 5) to an arm or lever $o^8$, which is pivotally connected at $o^9$ with the supporting-frame of the machine.

$o^{10}$ represents a cam, affixed to the driving-shaft $b$, and arranged to bear upon the lever $o^8$ and depress the latter once during each rotation of the driving-shaft. The rod $o^4$ is pressed upwardly by a spring $o^{12}$ toward the cam $o^{10}$. Said rod is provided with an incline $o^{13}$ (Fig. 16), which bears against the inclined end of a locking collar $o^{14}$, which is fitted to move slightly in a slot in the arm $o^3$, and in a direction at right angles with the connecting-rod $c^6$, said locking collar surrounding the sleeve $o^2$. When the rod $o^4$ is raised by the spring $o^{12}$, the incline $o^{13}$ leaves the locking collar $o^{14}$ in a loose condition on the sleeve $o^2$. The contact of the cam $o^{10}$ with the lever $o^8$ depresses the rod $o^4$, and thus causes the incline $o^{13}$ on said rod to press the locking collar $o^{14}$ firmly against the sleeve $o^2$, so that said locking collar constitutes a rigid connection between the rod $o^4$ and the sleeve $o^2$, said rod and sleeve being moved downwardly together by the action of the cam $o^{10}$ on the lever $o^8$. The spring $o$ is thus compressed and exerts a downward pressure upon the connecting-rod $c^6$, which pressure is imparted in a reversed direction to the horn. When the cam $o^{10}$, in its revolution, passes away from the lever $o^8$, the spring $o^{12}$ raises the rod $o^4$, thus causing the incline $o^{13}$ to release the locking collar $o^{14}$, and remove the pressure of the spring $o$ from the connecting-rod and horn. A spring $o^{15}$, which is weaker than the spring $o^{12}$, is preferably interposed between the under side of the arm $o^3$ and a nut or enlargement on the lower end of the rod $o^4$, said weaker spring constituting a yielding stop or cushion for the rod $o^4$ when the latter is raised.

The horn is locked, preparatory to the operation of perforating the material and driving the staple, by means of a locking collar $p$ (Figs. 3 and 16), surrounding the connecting-rod $c^6$, and connected by a rod $p'$ with a suitable moving part of the machine, preferably the lever $k^{20}$, as shown in Fig. 3, the arrangement being such that, when the rod $p'$ is moved in the direction indicated by the arrow marked thereon in Fig. 16, the locking collar $p$ will be caused to bind upon the rod $c^6$, and thus rigidly lock said rod to the supporting-frame, the locking collar being interposed between two ears $a^6$ $a^6$, affixed to the supporting-frame and preventing vertical movement of the locking collar, the connecting-rod $c^6$ being adapted to slide in orifices in said ears. The movements of the locking collar $p$ are so timed that the horn is locked and made rigid after the compression of the spring $o$, and before the descent of the awl and driver, and is released and left free to slide vertically in the ears $a^6$ after the sole has been penetrated and has received the staple, and after the spring $o$ has been released.

The feeding mechanism which we prefer to employ to feed the work after the driving of each staple is as follows: $r$ represents a feed dog, attached to a lever $r'$, which is pivoted at $r^2$ (Fig. 2) to an arm $r^3$, loosely mounted upon a stud $r^{40}$, on a crank or offset arm $r^4$, affixed to a rock-shaft $r^5$. Said rock-shaft is journaled in fixed bearings on the supporting-frame, and is rocked or oscillated by means of a cam $r^6$ (Fig. 5) on the driving-shaft, an arm $r^7$ affixed to a tubular rock-shaft $r^8$ journaled on a fixed bearing and provided with an arm $r^9$, and an arm $r^{10}$ connected by a bolt $r^{12}$ with the arm $r^9$.

$r^{13}$ represents another rock-shaft, journaled in fixed bearings on the supporting-frame, parallel with the rock-shaft $r^5$, and provided at one end with a crank or offset arm $r^{14}$ (Figs. 2 and 4).

$r^{16}$ represents a rod, pivoted at its lower end to an arm $r^{17}$ (Figs. 2 and 4), affixed rigidly to the crank $r^4$ and at its other end to a lever $r^{18}$, which is pivoted at $r^{91}$ to the crank $r^{14}$, and has at one end a stem $r^{15}$, which is engaged with the upper end of the feed dog lever $r'$. The rock-shaft $r^{13}$ is oscillated by means of a cam $r^{31}$ (Fig. 6), affixed to the rock-shaft $b$, and an arm $r^{19}$, affixed to said rock-shaft and having a trundle-roll $r^{20}$ engaged with said cam.

The arm or crank of the rock-shaft $r^{13}$ extends in a substantially horizontal direction, so that the stud $r^{15}$ has an approximately vertical movement; while the arm $r^4$ extends in a substantially vertical direction, so that the stud $r^{40}$ has an approximately horizontal movement; the result being a four-part movement of the feed dog, the same moving downwardly horizontally in one direction, then upwardly, then horizontally in the opposite direction.

The lever $r'$, to which the feed dog is attached, is located between two flanges $d^5\ d^5$ (Figs. 2, 4 and 30) on the sliding head $d$, said flanges being in close contact with the lever $r'$, so that the longitudinal movements of the head cause the lever to move laterally, this movement being permitted by the loose connection of the lever with the studs $r^2$ and $r^{15}$.

$s$ represents the reel upon which a coil of the wire $g$ is supported. Said reel is mounted to rotate loosely upon a stud $s'$, which is affixed to an arm or frame $s^2$, which is pivoted at $s^3$ to a fixed ear on the supporting-frame. The frame $s^2$ has a downwardly-projecting arm $s^4$ (Fig. 3), having a stud $s^5$, on which is mounted a trundle-roll $s^6$, bearing upon a cam $s^7$ affixed to the driving-shaft. The trundle-roll $s^6$ is located at the opposite side of the pivot $s^3$ from the reel, and the arrangement is such that the weight of the reel will cause the trundle-roll to bear yieldingly against the cam $s^7$. The rotation of the cam gives the reel an oscillating movement, for a purpose which will be presently described.

The operation is as follows: The awls and driver being raised and the horn unlocked and supported only by the pressure of the light spring $m$, the operator places the shoe upon the horn, the sliding head $d$ being in position to hold the awls in proper position over the work-supporting anvil on the horn to penetrate the sole at the right place. The awls then descend and perforate the sole, and at the same time the wire is fed across the anvil by the feeding arm, and then cut, while the forward end of the wire is held by the spring $j^2$ on the anvil. The anvil then moves forward, and at the same time the awls rise out of the way of the anvil. The throat $c^{14}$ then descends and bends the wire blank and holds it in line with the driver. The sliding head $d$ then moves forward, carrying with it the throat, staple, driver, awls and feed dog, this motion removing the throat from the anvil, and leaving it over the holes previously made by the awls. The throat is then depressed, and bears on the upper surface of the sole, and at this point the spring $o$ is compressed, and its pressure is exerted on the horn to compress the sole, after which the horn is locked, as above described. The driver then descends and drives the staple, the legs of the staple being at the same time clinched upon the horn. The throat and driver then rise, and at the same time the sliding head $d$ moves about half-way back and then stops, leaving the feed dog in line with the staple. While the head is in this position, the feed dog is depressed, and enters the sole, after which the horn is unlocked and the feed dog is moved horizontally to feed the work, the pressure of the spring $o$ being at this point removed, so that the horn is pressed only by the light spring $m$. The downward movement of the feed dog is produced by the downward movement of the crank or arm $r^{14}$ of the rock-shaft $r^{13}$, the rock-shaft $r^5$ being at this time held stationary by its operating cam. When the feed dog has been depressed, the rock-shaft $r^{13}$ is held stationary by its operating cam, and the rock-shaft $r^5$ is oscillated to give the feed dog its forward horizontal movement. The upward and backward movements of the feed dog are similarly produced. After the feed dog has been raised from the work, the sliding head $d$ completes its backward movement, thus bringing the awls again into position to penetrate the work. The described means for oscillating the reel are timed to give the reel a downward swinging movement toward the cutters while the wire-feeding arm $k$ is moving backward to take a fresh hold upon the wire, said movement of the reel making the wire slack between the reel and the cutters. The reel remains depressed until the wire has been fed by the feeding arm $k$. The reel swings upwardly while the wire is locked to the feed arm. The object of the described swinging movement of the reel is to enable the feed arm to quickly feed or move the wire forward without being obliged to overcome the inertia of the reel by pulling the wire directly from the reel, the slack in the wire between the reel and the feed arm, caused by the downward movement of the reel, affording sufficient or nearly sufficient wire for the next staple.

The manner in which the position of the anvil relatively to the cutters and the length of movement of the wire-feeding arm are controlled by the position of the horn has been already fully described, and from the description it will be apparent that the depth to which the awls penetrate the sole is also controlled by the vertical position of the horn, by reason of the fact that the lever $c^7$ is pivoted at $c^{70}$ to the upper end of the connecting-rod $c^6$, so that the forward end of said lever, which is connected by the link $c^{12}$ with the awl-bar, is raised and lowered by the downward and upward movements of the offset connecting-rod, so that, when the connecting-rod is raised by an increase of thickness of the sole, resulting in a corresponding depression of the horn, the forward end of the lever $c^7$ is correspondingly depressed, so that the operation of the arm $c^9$ that oscillates said lever will give an increased downward movement to the awls. When the thickness of the sole decreases, the horn correspondingly rises, and the connecting-rod $c^6$ is depressed, so that the awls are correspondingly raised and therefore enter the stock less deeply.

We believe ourselves to be the first to provide a staple-making and driving machine having the following features, namely: first, a pair of awls, adapted to simultaneously make holes for the two legs of a staple, and connected with a vertically movably horn, in such manner that the depth of penetration of the awls will be determined by the vertical position of the horn; secondly, a horn, which is at all times pressed upwardly by light spring pressure, and is intermittingly pressed upwardly by heavier spring pressure before it is locked; thirdly, a staple-forming anvil, which is movable laterally with relation to the wire-forming cutters, and is controlled as to its distance from the cutters by the position of the horn; and, fourthly, a sliding head, provided with awls, a feed device and a driver, and mechanism for moving said head to bring said awls, feeding device and driver interchangeably into a given position. We do not therefore limit ourselves to the details of construction here shown, embodying said features, and may vary the construction in various particulars, without departing from the spirit of our invention. Neither do we limit ourselves to the details of mechanism of various other parts of the machine, not enumerated in the above list of novel features.

Those portions of our invention which relate to the operation of inserting a fastening device in the material are not necessarily limited to machines in which the fastener is made as well as driven, nor to machines in which the fastening device is a staple, as several of the important features of our invention may be used in connection with machines for driving fasteners previously made by another machine, and in machines for making and driving single nails not of staple form. When the machine is not used for making and driving staples, the throat, which guides the driver while engaged with the sliding head so as to be interchangeably in position with the awl, need not necessarily be reciprocated vertically.

By the term sliding head, as used in this specification, we mean any carrier which is engaged with the awl-bar and the driver-guiding throat, and is adapted to be moved back and forth in such manner as to cause the awl-bar and throat to interchangeably occupy substantially the same position. The back and forth motion may be imparted to the said head or carrier in any suitable way, our invention not being limited to a carrier which slides in a guide.

The terms horizontal and vertical, as applied to the direction of movement of the head, awl-bar, throat and driver, are used relatively, and are intended to express the idea that the movement of the head is substantially at right angles to the movement of the awl-bar, throat and driver.

In case the machine, provided with a sliding head, an awl-bar and a throat engaged with said head, and a driver guided by the throat, is used for driving single nails or fastenings, only one awl will be required on the awl-bar: hence, in several of the following claims, we have specified the awl-bar having a perforating awl.

We claim—

1. In a machine for driving metallic fastenings, the combination of a vertically movable work-supporting horn, a light spring exerting a constant upward pressure on the horn, an auxiliary spring and connections between it and the horn, automatic means for alternately compressing and releasing said auxiliary spring and thereby alternately increasing and decreasing the upward pressure on the horn and automatic means substantially as described for locking the horn after said pressure is increased, as set forth.

2. In a machine for driving metallic fastenings, the combination of a vertically movable work-supporting horn having an upward yielding movement, a perforating awl located over the horn, awl-operating mechanism substantially as described adapted to impart a varying depth of movement to the awl, and connections between said awl-operating mechanism and the horn whereby the depth of movement of the awl is determined by the position of the horn, as set forth.

3. In a machine for driving metallic fastenings, the combination of a vertically movable work-supporting horn having an upward yielding movement, a vertically movable awl-bar carrying a perforating awl, located over the horn, a vertically oscillating lever connected with said awl-bar, a vertically movable fulcrum or pivot supporting said lever, connections between said fulcrum and the horn whereby the position of the fulcrum is varied by changes of position of the horn, and means for oscillating said lever and thereby giving the awl-bar a reciprocating movement the depth of which is determined by the position of the horn, as set forth.

4. In a machine for driving metallic fastenings, the combination of a vertically movable work-supporting horn, a lever supporting the spindle of said horn, an awl-bar located over the horn and provided with a perforating awl, an awl-operating lever mounted to oscillate on a vertically movable fulcrum, means for oscillating said lever, a connecting-rod connecting said fulcrum with the horn-supporting lever, and a spring arranged to exert a constant upward pressure on the horn, as set forth.

5. In a machine for driving metallic fastenings, the combination of a vertically movable work-supporting horn, a lever supporting the spindle of said horn, an awl-bar located over the horn and provided with a perforating awl, an awl-operating lever mounted to oscillate on a vertically movable fulcrum, means for oscillating said lever, a connecting-rod connecting said fulcrum with the horn-supporting lever, a spring arranged to exert a constant upward pressure on the horn, an auxiliary spring mounted on the connecting-rod, a sleeve movable on said rod and bearing on the auxiliary spring, and automatic means for moving said sleeve back and forth on the connecting-rod and thereby alternately compressing and releasing the auxiliary spring, as set forth.

6. In a machine for driving metallic fastenings, the combination of a vertically movable work-supporting horn, a lever supporting the spindle of said horn, an awl-bar located over the horn and provided with a perforating awl, an awl-operating lever mounted to oscillate on a vertically movable fulcrum, means for oscillating said lever, a connecting-rod connecting said fulcrum with the horn-supporting lever, a spring arranged to exert a constant upward pressure on the horn, an auxiliary spring mounted on the connecting-rod, a sleeve movable on said rod and bearing on the auxiliary spring, automatic means for moving said sleeve back and forth on the connecting-rod and thereby alternately compressing and releasing the auxiliary spring, and automatic mechanism for alternately locking and releasing said rod, said mechanism being timed to lock the rod while the auxiliary spring is compressed, as set forth.

7. In a machine for driving metallic fastenings, the combination of a vertically movable work-supporting horn, a lever supporting the spindle of said horn, an awl-bar located over the horn and provided with a perforating awl, an awl-operating lever mounted to oscillate on a vertically movable fulcrum, means for oscillating said lever, a connecting-rod connecting said fulcrum with the horn-supporting lever, a spring arranged to exert a constant upward pressure on the horn, an auxiliary spring mounted on the connecting-rod, a sleeve movable on said rod and bearing on the auxiliary spring, a vertically movable rod or stud $o^4$, connections between said stud and the driving-shaft of the machine whereby the stud is depressed at intervals, and a locking device operated by the depression of the stud to lock the latter to the sleeve and thereby cause the depression of the sleeve, as set forth.

8. In a machine for making and driving staples, the combination of a horn or work-support, an awl-bar and a staple-guiding throat located above the work-support and both movable toward and from the latter, an awl on the awl bar, a driver movable in said throat, a sliding head engaged with said awl-bar and throat, a work feeding device engaged with said head, mechanism for horizontally reciprocating said head, mechanism for vertically reciprocating said awl-bar, throat and driver feed operating mechanism, and an anvil which co-operates with the throat in bending a wire blank into a staple, as set forth.

9. In a machine for driving metallic fasteners, the combination of a horn or work-support, an awl-bar and a fastener-guiding throat located above the work-support, an awl affixed to the awl bar a driver movable in said throat, a sliding head engaged with said awl-bar and throat, a feed lever carrying a feed-dog and engaged with said head, mechanism for reciprocating said head horizontally to cause the awl-bar, throat and feed-dog to successively occupy substantially the same position, and mechanism for operating said awl-bar, driver and feed-dog, as set forth.

10. In a machine for making and driving staples, the combination of a work-supporting horn, a vertically movable awl-bar over said horn, having two awls, a vertically movable staple-receiving throat, a vertically movable staple driver in said throat, a horizontally movable head engaged with said awl-bar and throat, an awl-bar-operating lever mounted to oscillate on a vertically movable fulcrum and connected with the awl-bar by a connecting-rod, connections between said fulcrum and the horn whereby the fulcrum and horn are moved simultaneously, a throat-operating lever, a driver-operating lever, rods connecting said levers respectively with the throat and driver, a driving-shaft having a series of operating cams, connections between said cams and the head, the awl-operating lever, the throat-operating lever and the driver-operating lever, an anvil and operating mechanism therefor co-operating with the throat in bending wire blanks into staples, and wire-feeding and cutting devices, all substantially as set forth.

11. In a machine for making and driving staples, the combination of a vertically movable work-supporting horn, a vertically movable staple-receiving throat over said horn, a vertically movable driver in said throat, an anvil which co-operates with said throat in forming a staple from a wire blank, cutters located beside said anvil, a movable anvil-support, mechanism for reciprocating said support to carry the anvil toward and from the throat, and connections between said support and the horn whereby the support and anvil are moved toward and from the cutters by changes of position of the horn, as set forth.

12. In a machine for making and driving staples, the combination of a vertically movable work-supporting horn, a vertically movable staple-receiving throat over said horn, a vertically movable driver in said throat, an anvil which co-operates with said throat in forming a staple from a wire blank, cutters located beside said anvil, a movable anvil-support, mechanism for reciprocating said support to carry the anvil toward and from the throat, a disk or plate mounted to turn on the frame of the machine and engaged with the anvil-support, and mechanism substantially as described connecting said disk or plate with the horn whereby the disk or plate is partially rotated and caused to move the anvil-support and anvil laterally when the horn is moved vertically, as set forth.

13. In a machine for making and driving staples, the combination of a vertically movable work-supporting horn, a vertically movable staple-receiving throat over said horn, a vertically movable driver in said throat, an anvil which co-operates with said throat in forming a staple from a wire blank, cutters located beside said anvil, a movable anvil-support, mechanism for reciprocating said support to carry the anvil toward and from the throat, connections between said support and the horn whereby the support and anvil are moved toward or from the cutters by changes of position of the horn, a wire-feeding device, mechanism for moving the same toward and from the cutters, and mechanism controlled by the horn whereby the length of feed is determined by the position of the horn, as set forth.

14. In a machine for making and driving staples, the combination of a vertically movable work-supporting horn, a vertically movable staple-receiving throat over said horn, a vertically movable driver in said throat, an anvil which co-operates with said throat in forming a staple from a wire blank, cutters located beside said anvil, and having a fixed support so that they do not move laterally a wire-feeding arm which is moved alternately toward and from the cutters and is provided with a jaw which alternately grasps and releases the wire, a feed-regulating arm or stop which limits the movement of the feeding arm away from the cutters, and connections between said regulating arm and the horn whereby the position of said arm is determined by the position of the horn, as set forth.

15. In a machine for making and driving staples, the combination of a vertically movable work-supporting horn, a vertically movable staple-receiving throat over said horn, a vertically movable driver in said throat, an anvil which co-operates with said throat in forming a staple from a wire blank, cutters located beside said anvil, and having a fixed support a wire-feeding arm which is moved alternately toward and from the cutters, a wire-grasping and releasing jaw in said arm, and mechanism substantially as described whereby said jaw is caused to alternately grasp and release the wire, as set forth.

16. In a machine for making and driving staples, the combination of a vertically movable work-supporting horn, a vertically movable staple-receiving throat over said horn, a vertically movable driver in said throat, an anvil which co-operates with said throat in forming a staple from a wire blank, cutters located beside said anvil, and having a fixed support a wire-feeding arm which is moved alternately toward and from the cutters and is provided with a jaw which alternately grasps and releases the wire, a wire-grasping jaw engaged with the supporting-frame, and mechanism substantially as described whereby said jaw is caused to alternate with the jaw of the feeding arm in grasping and releasing the wire, as set forth.

17. In a machine for making and driving metallic fastenings, the combination with wire-cutters and a wire-feeding device movable toward and from said cutters, of a wire-supporting reel, a movable carrier or support therefor, and automatic means for moving said reel toward and from the feeding device, as set forth.

18. In a machine for making and driving staples, the combination of a fixed cutter, a segmental cutter, a rocking hub or holder supporting the segmental cutter, means for rocking said holder, a point bender consisting of a slide or bar movable in a slot across said holder, and means for moving said bender to cause the bending of the point formed on the wire by the action of the cutters, as set forth.

19. In a machine for making and driving staples, the combination of a fixed cutter, a segmental cutter, a rocking hub or holder supporting the segmental cutter, means for rocking said holder, a point bender consisting of a slide or bar movable in a slot across said holder, a reciprocating slide adjacent to said cutters, and a lever pivoted to said slide and engaged with said bender, said lever having arms or projections formed to bear on said slide and lock the lever to the slide to cause the operation of the bender, as set forth.

In testimony whereof we have signed our names to this specification, in the presence of two subscribing witnesses, this 5th day of July, A. D. 1892.

HENRY H. CUMMINGS.
    PETER A. COUPAL.

Witnesses:
 C. F. BROWN,
 A. D. HARRISON.